United States Patent [19]
Henck

[11] Patent Number: 5,425,839
[45] Date of Patent: Jun. 20, 1995

[54] METHOD FOR RAPIDLY ETCHING MATERIAL ON A SEMICONDUCTOR DEVICE

[75] Inventor: Steven A. Henck, Plano, Tex.

[73] Assignee: Texas Instruments Incorporated, Dallas, Tex.

[21] Appl. No.: 882,779

[22] Filed: May 14, 1992

[51] Int. Cl.$^6$ .................. H01L 21/00; G01N 21/00
[52] U.S. Cl. ..................... 156/626.1; 204/192.33
[58] Field of Search ............... 156/626, 627, 345, 643; 204/192.32, 192.33, 298.31, 298.32

[56] References Cited

U.S. PATENT DOCUMENTS

| | | | |
|---|---|---|---|
| 4,105,338 | 8/1978 | Kuroha | 356/118 |
| 4,218,924 | 8/1980 | Fortunko et al. | 73/642 |
| 4,332,833 | 6/1982 | Aspens et al. | 156/627 |
| 4,434,025 | 2/1984 | Robillard | 156/601 |
| 4,838,694 | 6/1989 | Betz et al. | 156/626 |
| 4,927,485 | 5/1990 | Cheng et al. | 156/345 |
| 5,002,631 | 3/1991 | Giapsis et al. | 204/298.32 |
| 5,131,752 | 7/1992 | Yu et al. | 156/626 |

FOREIGN PATENT DOCUMENTS

| | | |
|---|---|---|
| 59-003925 | 1/1984 | Japan . |
| 63-254733 | 10/1988 | Japan . |
| 03-082120 | 4/1991 | Japan . |
| 04-082217 | 3/1992 | Japan . |

Primary Examiner—Thi Dang
Attorney, Agent, or Firm—James C. Kesterson; Richard L. Donaldson

[57] ABSTRACT

Apparatus and methods for precise processing of thin materials in a process chamber by the use of ellipsometer monitoring is disclosed. The process includes rapidly etching a layer 42 of material covering a semiconductor device. The process includes placing the semiconductor wafer 14 into a processing chamber 10. In a typical operation, the wafer 14 will include a selected substrate 32 having a first thin layer 30 of material covering the substrate 32 and then a second layer 42 of a different material covering the first layer 30. A process such as reactive ion anisotropic etching which rapidly etches the second layer 42 is initiated and this etching is monitored in situ by an ellipsometer in combination with a controller 28 to determine the thickness of the second layer 42' which has been achieved. Once the desired amount of second layer 42 remains, the rapid etching process stops to leave a residual layer 42' such as about 250 Å or in a preferred embodiment a thickness equivalent to about one molecular layer. A second chemical isotropic etching process step then starts which may be substantially ineffective at etching the first layer 30 of material and which etching process consequently is typically substantially slower than the first etching process. Since only a very thin layer remains, the slow speed or isotropic nature of the second etching process does not take an unacceptable amount of time or cause other problems, such as loss of critical dimension.

10 Claims, 4 Drawing Sheets ized by the change in amplitude, Psi ($\Psi$), and the change in phase, Delta ($\Delta$) of the
METHOD FOR RAPIDLY ETCHING MATERIAL ON A SEMICONDUCTOR DEVICE

FIELD OF THE INVENTION

This invention generally relates to a method for processing a layer of material on a semiconductor device, and more specifically to rapidly etching such a layer when the layer covers another layer of material which is even more susceptible to etching, and whose thickness is monitored in situ and in real-time by the use of an ellipsometer.

BACKGROUND OF THE INVENTION

Without limiting the scope of the invention, its background is described in connection with previously used techniques of time etching silicon dioxide and polysilicon.

Controlling the thickness of thin films is of prime importance in the fabrication of semiconductor devices. As the minimum feature size of devices such as transistors decreases, the tolerances on the film properties also must decrease. At present, the tightest tolerances encountered in advanced CMOS devices are related to the thickness of the oxide gate layer, and are typically held to about $\pm$ three (3) Å (angstroms). Heretofore, ex situ thin film analysis has been routinely used to monitor film thickness and to provide the feedback concerning a fabrication process. This is true, since automatic and fast in situ analysis of the film and the fabrication process has not been available. Although a fast in situ analysis would be much more desirable for accurate and precise control, there has been no known successful use of ellipsometry for measurement of the in situ film thickness of semiconductor devices in real-time. There are several reasons which have discouraged such in situ real-time use, including the difficulty of determining the desired thickness parameter from the Psi ($\Psi$) and Delta ($\Delta$) parameters, which are more readily available through ellipsometric techniques. Further, the speed at which Psi ($\Psi$) and Delta ($\Delta$) parameters' measurements can be obtained was entirely too slow.

Ellipsometry is an optical technique which measures the change in polarization of light upon reflection or transmission of the light through a film or interface. This change is characterized by the change in amplitude, Psi ($\Psi$), and the change in phase, Delta ($\Delta$) of the light polarized in the plane parallel to the plane of incidence relative to the light polarized in the plane perpendicular to plane of incidence. The ellipsometric parameters Psi and Delta are sensitive to the thickness and refractive indexes of the films and the substrate as well as the wavelength and the angle of incidence of the light beam. Consequently, ellipsometry does offer the prospect of measuring in situ film thicknesses to the accuracy and precision necessary without perturbing the process system or physically contacting the wafer. To date, using the process of this invention, films have been produced which have reproducibility in their thicknesses between $\pm$ three (3) Å. Further, it is anticipated that film thickness accuracy and precision of up to $\pm$ one (1) Å may be possible using the techniques of this invention.

Therefore, it is an object of this invention to provide methods and apparatus for achieving in situ measurement techniques which can produce thin films having a deviation of no more than $\pm$ three (3) Å.

SUMMARY OF THE INVENTION

Other objects and advantages in the invention will in part be obvious, and will in part appear hereinafter, and will be accomplished by the present invention which provides methods and apparatus for rapidly etching a layer of material used in the fabrication of semiconductor devices. A preferred embodiment of the method comprises the steps of providing a semiconductor device which may have a layer of a first material covering certain selected portions of a substrate which in turn is covered by a second layer of a different or second material of a known thickness. The semiconductor device is placed in a vacuum chamber for processing. While under vacuum conditions, the second layer is etched by a first known etching process at a rapid rate such as, for example, reactive ion etching which is anisotropic. As will be understood from the following discussion, the value of the method of this invention is most apparent when the first layer is very thin and is made of a material which may be susceptible to the first etching process. This rapid etching is monitored in situ, i.e. in the vacuum chamber, by means of an ellipsometer so as to obtain results substantially in real-time. Based upon the thickness measurements provided by the in situ and substantial real-time monitoring of the ellipsometer, the rapid etching of the second layer is stopped so as to leave a very thin residue layer covering the first layer. This residue layer is then etched by means of another and much more selective and less damaging etching process (such as, for example, an isotropic chemical or wet etch) so as to completely remove the second material and expose the first layer. In the preferred embodiment, the etchant used for etching the residue layer is selected when possible to be an etchant which is highly selective or substantially ineffective to etch the first layer.

BRIEF DESCRIPTION OF THE DRAWINGS

The above-mentioned features as well as other features of the present invention will be more clearly understood from the consideration of the following description in connection with the accompanying drawings in which.

DETAILED DESCRIPTION OF THE INVENTION

Figure 1:
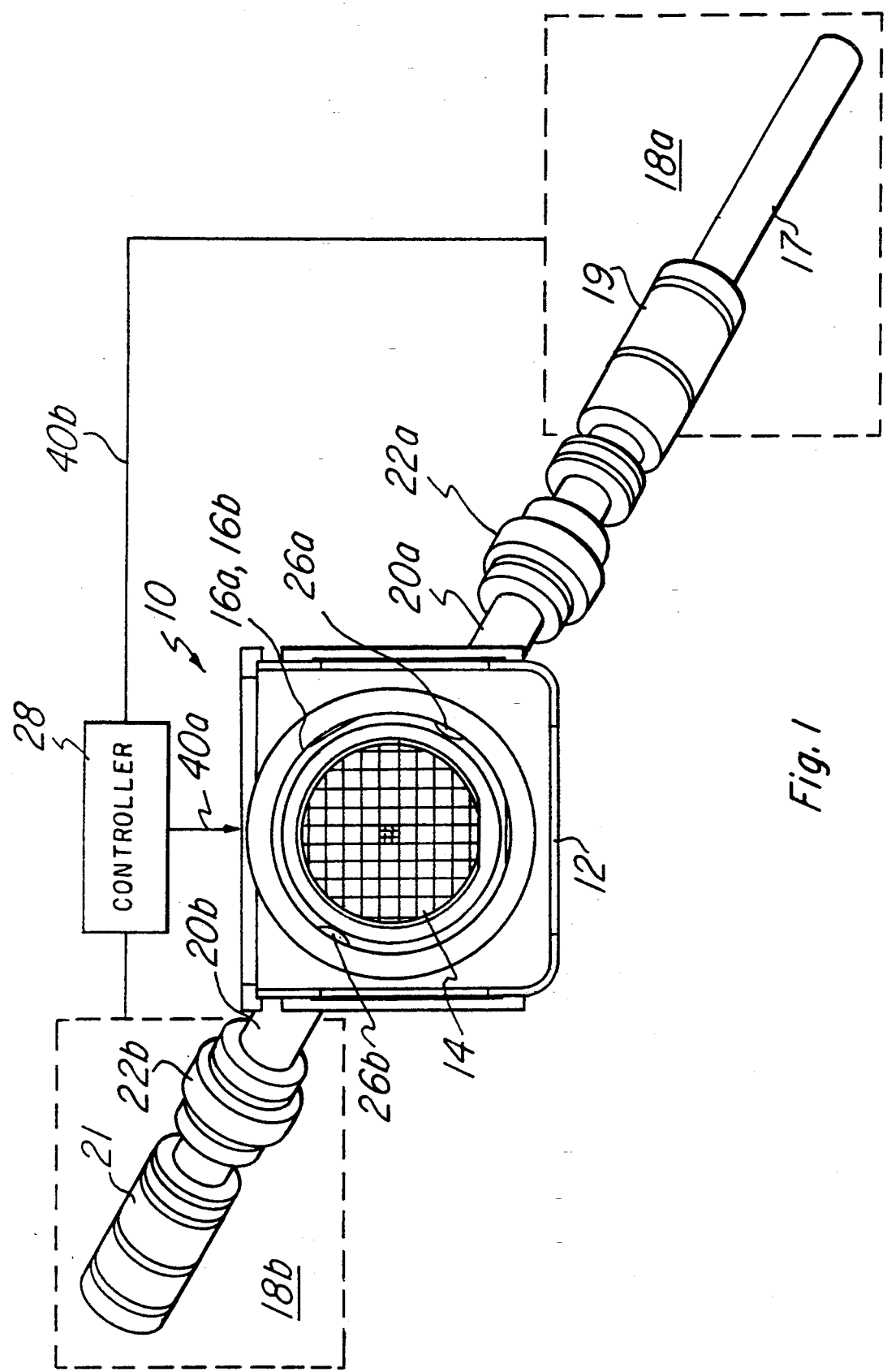
FIG. 1 shows a top view of an ellipsometer attached to a plasma etch chamber to provide in situ measurements.
Figure 2:
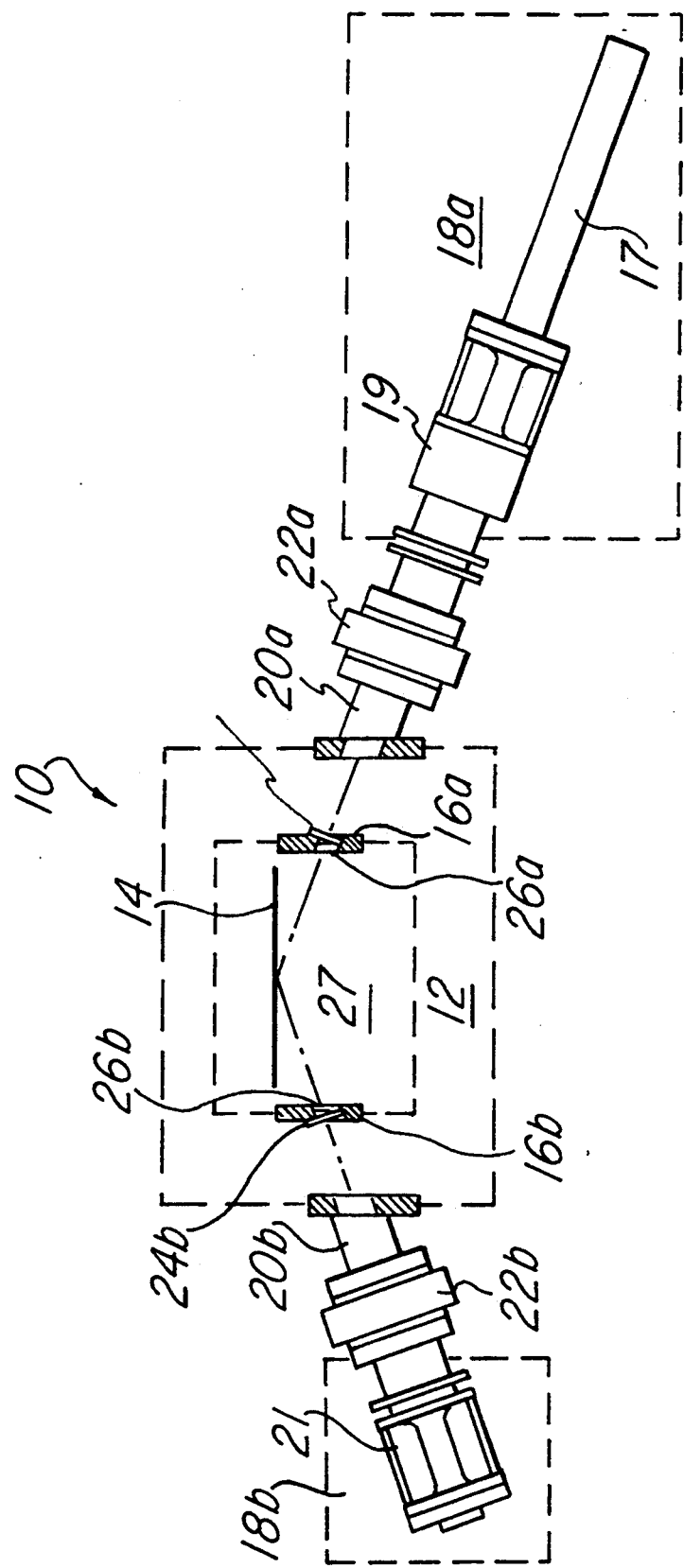
FIG. 2 shows a side view and partial cross section of FIG. 1.

As shown in FIGS. 1 and 2, there is a processing chamber 10 having outer chamber walls 12 for maintaining a vacuum inside chamber 10. The processing chamber 10 as shown is a parallel-plate RF system plasma etch chamber for processing a single wafer 14, typically having a diameter of about 150 millimeters.

The wafer 14 is clamped to a temperature controlled powered electrode (not shown). In the embodiment shown, the chamber 10 runs in a reactive ion etch mode, and it will be appreciated that although a specific type of processing chamber has been described, this invention is fully applicable to other types of processing chambers which provide for thin film processing, including etching. Other suitable chambers, for example, may include the capability of processing a large number of wafers at one time.

The processing chamber 10 includes of a quartz collar 16A, 16B which is raised against the electrode by a bellows once the wafer 14 is loaded. This forms the processing region. The outer wall 12 of processing chamber 10 forms a stainless steel vacuum chamber. As shown, there is an ellipsometer 18A and 18B connected to the processing chamber 10 for measuring the film thickness of the wafer 14. As shown, both portions 18A (which includes a laser 17 and a polarizer 19) and 18B (which includes an analyzer 21 and a detector) of the ellipsometer are attached to the outer chamber walls 12 by flanges 20A and 20B welded to the outer walls 12 of chamber 10. Located between the two portions 18A and 18B of the ellipsometer and flanges 20A and 20B welded to outer chamber wall 10 are a set of feed-through ports 22A and 22B. These feed-through ports 22A and 22B allowed for additional flexibility in the alignment in the ellipsometer. A pair of windows 24A and 24B, such as quartz or fused silica, and typically about 0.125 inches thick, are mounted over holes 26A and 26B drilled through the quartz collars 16A and 16B attached to the inner chamber wall 27. Measurements indicated that the effect of the windows 24A and 24B on the process is so small that it is not detectable.

In the embodiments shown, the ellipsometer 18A and 18B is controlled by a controller 28. One controller found particularly suitable for this purpose is a 386, 16 MHz Texas Instruments SP-1000 computer complemented by a 80387 math coprocesssor. A particularly suitable ellipsometer is a Sofie STE 70 ellipsometer. It will be appreciated of course that although a specific type of computer and ellipsometer have been described, ellipsometers and computers of other manufacturers may be equally applicable. The Texas Instruments and Sofie equipment as proposed can obtain measurements of Psi and Delta at variable time intervals down to about 0.08 seconds. The equipment as described using a Sofie STE 70 ellipsometer rotates its bi-refringent plate at about 8,000 RPMs or approximately 0.01 seconds per revolution. Theoretically, the data acquisition rate of the ellipsometer is limited by the rate of modulation of the beam. However, the system needs the remainder of the 0.08 seconds for calculations. Using the computer as described above, the system can convert the Psi-Delta information to thickness at intervals of about 0.15 seconds.

Figure 3:
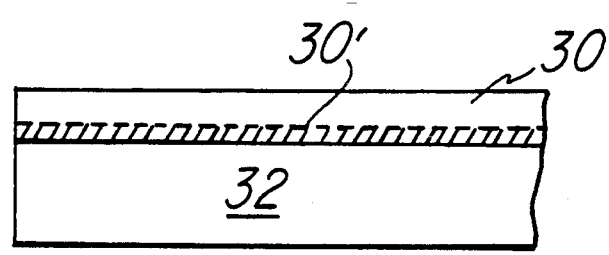
FIG. 3 is a partial cross-section of a wafer processed according to a teaching of this invention.

According to one test of an embodiment of the method of this invention and as shown in FIG. 3, a 150 millimeter wafer 14 has a layer 30 of a first material of a known thickness such as, for example, around 6000 Å of silicon dioxide ($SiO_2$) covering substrate 32 which is typically silicon. Wafer 14 is then placed in the vacuum processing chamber 10. The vacuum chamber or processing chamber 10 then has the pressure reduced to approximately 400 mTorr and anisotropic reactive ion etching of layer 30 is then carried out. The etching of the layer 30 continues at a rapid rate and typically will use an etch gas of carbon tetra-fluoride ($CF_4$) having a gas flow rate of about between 20 to 75 sccm (preferably 75 sccm). The RF power of the etching process is selected to be between about 50–300 watts (preferably 300 watts) and the frequency of the power supplied is about 13.56 MHz, but could of course vary from this frequency. The temperature of the chamber is maintained at between about 5°–30° C. and preferably at about 7° C. During the process, the surface of wafer 14 is continuously monitored about every 0.15 seconds by ellipsometer 18A and 18B to determine the thickness of the residual silicon dioxide layer 30' until the silicon dioxide layer 30 is completely removed.

Figure 4:
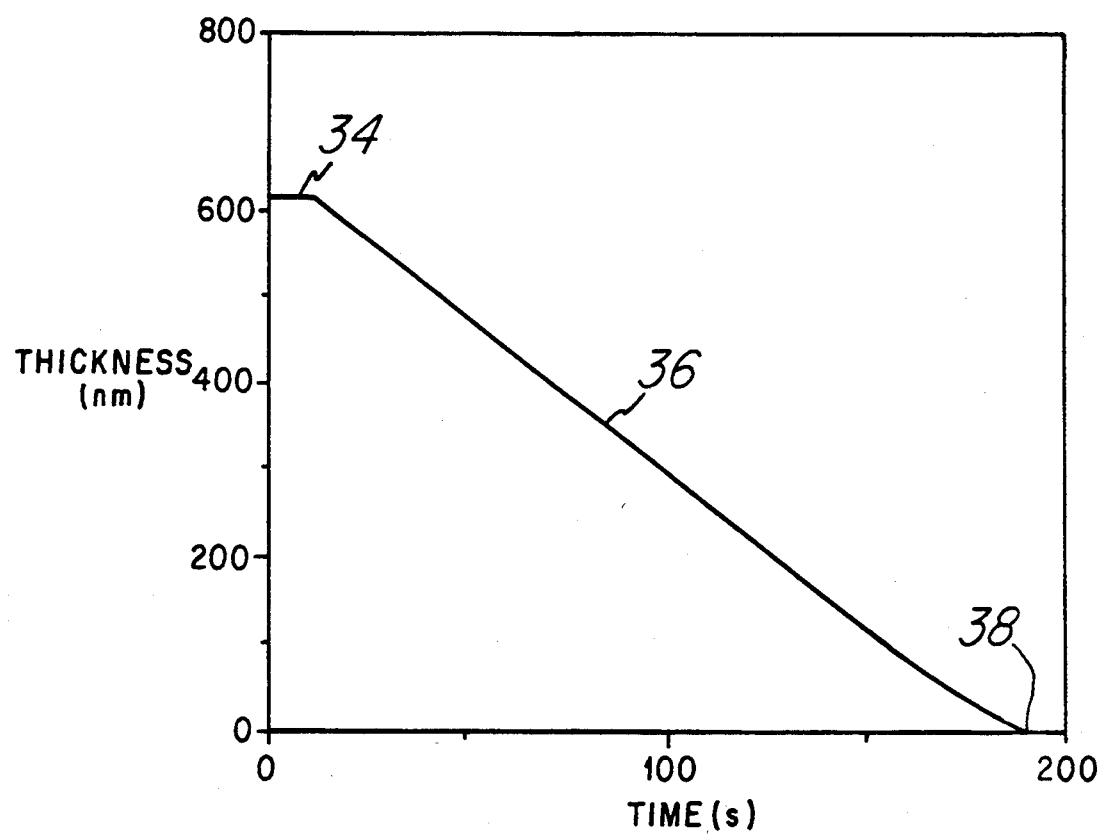
FIG. 4 is a graph of the thickness versus time for an etch of oxide on silicon.

Referring now to FIG. 4, there is a plot of actual results showing the thickness of the silicon dioxide layer 30' versus etching time obtained in real-time, and using the in situ ellipsometer for etching 6,147 Å (or 615 nanometers). As shown, initially the measured thickness remains constant as shown by reference number 34 as the etching gases are turned on and the chamber pressure rises to its necessary operating level. The RF power is then turned on and the thickness immediately begins to decrease as shown by reference number 36. In the example shown in FIG. 4, all of the film is removed and overetching of the next layer or substrate would commence at reference point 38. However, as can be seen because of the extreme predictability of the curve, instead of completely removing the layer of material by etching, it is possible to select the final thickness of a residual layer by terminating the etching process when the desired amount of film thickness remains.

Therefore, according to another embodiment of the process of this invention, since the thickness of the residual layer being etched can be so closely determined, portions or all of a layer of material on a wafer may be etched to a selected thickness ±3 Å. For example, referring again to FIG. 3, a layer 30 of material such as silicon dioxide or other material having an accurately known thickness which is thicker than the desired final thickness is deposited on the substrate 32 of wafer 14. The reactive ion etching process as described above is initiated. As the etching proceeds, the ellipsometer 18A and 18B in combination with controller 28 periodically obtains actual thickness measurements of the residual layer 30'. These pluralities of measurements are then used by controller 28 to determine and continuously update the etching rate of the process. The continuously updated etching rate of layer 30 is then used to calculate the period of time that will be required to etch the layer sufficiently to leave a residual layer 30' of the desired thickness. For example, using the equipment described in the embodiment shown in FIGS. 1, 2 and 3, it is seen that for purposes of comparison or calibration one would make an initial measurement ex situ of the thickness of the layer 30 to be etched. The desired residual layer thickness 30' is then selected, and the thickness of the desired residual layer is then entered into the controller 28. The etch is then performed as discussed above except according to this embodiment the controller will signal the end point or in a more automatic embodiment send a signal on line 40 to terminate the etching process when the desired residual thickness remains.

Actual experiments comparing the results of this embodiment of the method of this invention and the prior art timed etch technique were performed. In the experiment, the present invention technique and the prior art timed etch technique each processed six wafers. The intent of the test, was to etch a layer of material to achieve among the six samples of each technique the same thicknesses (as close as possible). For the six wafers using the prior art timed etch technique, an etch of 45 seconds was selected. The goal of the second six wafers using the present invention was to achieve a thickness as close to 250 Å as possible. In both tests, the etches were manually terminated by simply shutting off the RF power. Thus, there was no advantage taken by the present invention of having the computer turn off the power automatically in response to the ellipsometer. The etching of all 12 samples proceeded according to the pressures, gas flow rates, RF power, frequencies, etc. discussed hereto above.

Referring now to Table 1 below, there is shown the starting wafers and the results of both the ellipsometer technique of this invention and the timed end point technique available prior to this invention. As can be seen from the Table, there is over a factor of 20 difference in the variances of the final thicknesses used in the two methods. Note that the variance using the prior art timed etch technique is 69 Å whereas the variance using the ellipsometer controlled etch technique of this invention is three (3) Å. It should also be noted, that it is clear that the large variations in thickness for the prior art technique using a timed end point arose from the process and not because of a variance in the starting film thickness. As can be seen, the starting film thickness for all 12 wafers had a deviation of no more than 5 Å. The reason for the variations using the prior art end timed method is that discrepancies arise because of the inconsistencies and variability of the pressure, mass flow controllers, RF power supply, RF coupling, reflected power, DC bias, etc. However, by using the real-time thickness measurements as determined by the computer and the ellipsometer, a selected ending thickness was obtained within ± three (3) Å. This was possible because the variations which so adversely effected the prior art technique would have no real effect on the technique of this invention as the real-time measurement simply would either extend the length of the etch or shorten the length of the etch as necessary to remove the selected amount of material. To provide a sense of scale achieved by the ellipsometry method, it should be noted that the bond length for silicon oxide is around 1.5 Å which means the molecular layer thickness of the double bonds will be about 3 Å.

TABLE 1

Comparison of etched oxide film thickness for timed and in situ ellipsometer controlled end point plasma etching.

| | Original Wafers | Ellipsometer Etch | End-Time Etch |
|---|---|---|---|
| Oxide Thickness* | 1836 Å | 247 Å | 493 Å |
| Std. Dev. | 5 Å | 3 Å | 69 Å |
| Etch Time | | 52.1 s | 45 s |
| Std. Dev. | | 6.7 s | |
| Number of Wafers | 12 | 6 | 6 |

*The pre and post etch thicknesses were verified ex situ.

Figure 6:
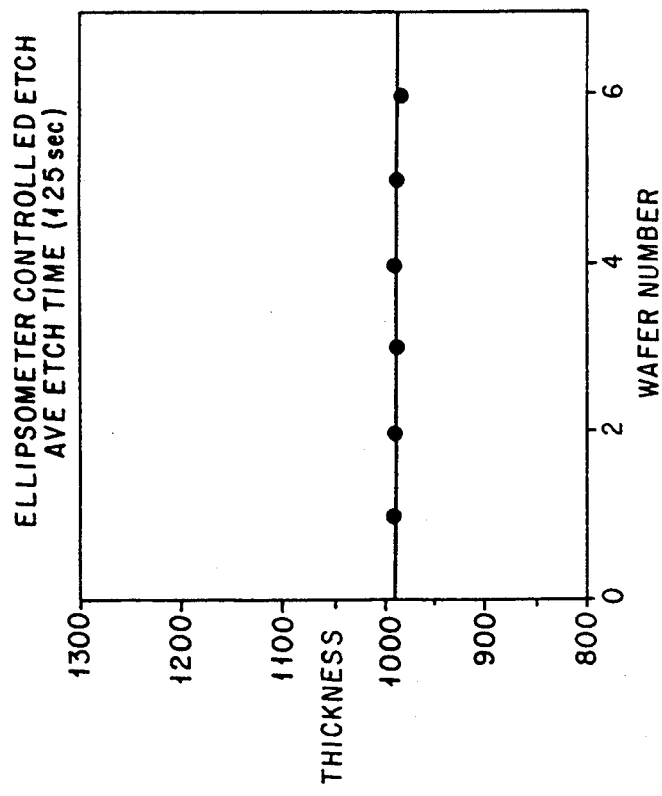
FIG. 6 is a graph showing the results achieved on six wafers using the process of this invention.
Figure 7:
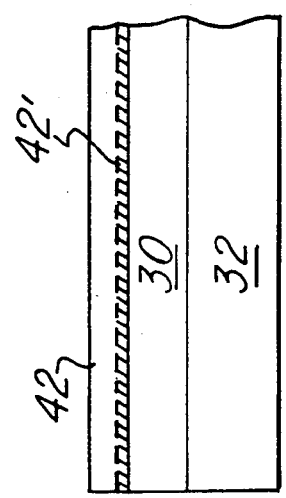
FIG. 7 is a partial cross-section of a wafer processed according to another embodiment of this invention.
Figure 5:
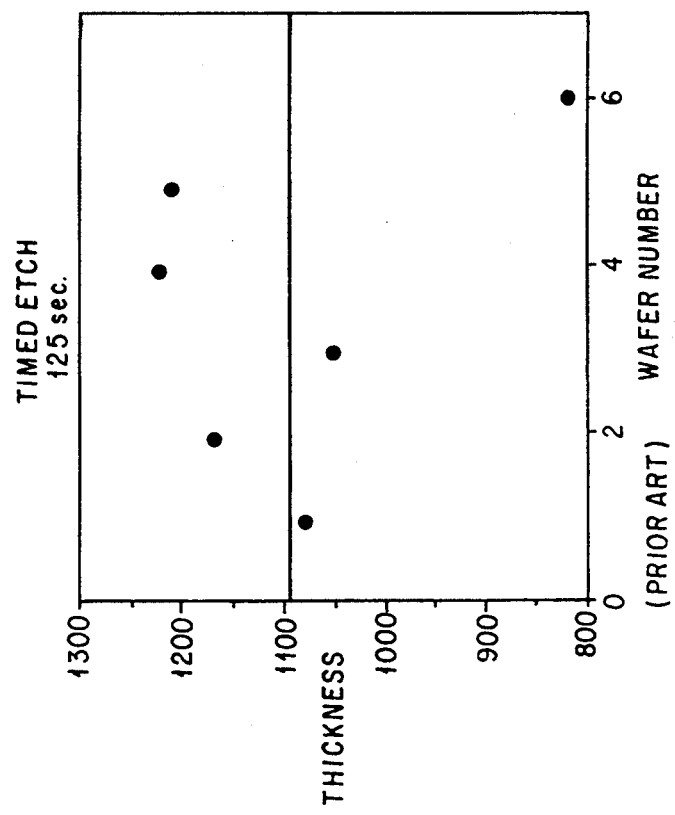
FIG. 5 is a graph showing the results achieved on six wafers using the prior art timed-etched technique.

Referring now to FIGS. 5 and 6, there are shown the results of additional testing using 12 other wafers. As shown in FIG. 7, 150 millimeter wafers 14 have a first layer 30 of a first material of a known thickness such as, for example, around 6000 Å of silicon dioxide ($SiO_2$) covering the wafer substrate 32 and a second layer 42 of another material such as, for example, around 3000 Å of polysilicon covering layer 30. Wafers 14 were then placed in the vacuum processing chamber 10. The vacuum chamber or processing chamber 10 then had the pressure reduced to approximately 400 mTorr and anisotropic reactive ion etching of second layer 42 was carried out. The etching of the second layer 42 continued at a rapid rate and in the experimental testing of the 12 wafers used an etch gas of carbon tetra-fluoride ($CF_4$) having a gas flow rate of about between 20 to 75 sccm (preferably 75 sccm). The RF power of the etching process was selected to be about 300 watts and the frequency of the power supplied was about 13.56 MHz. The temperature of the chamber is maintained at between about 5°-30° C. and in this experiment at about 7° C. During the process, the surface of wafers 14 was continuously monitored by ellipsometer 18A and 18B to determine the thickness of the residual polysilicon layer 42'. According to this test, using a prior art time etch of 125 seconds there was an attempt to obtain a residual layer 42' having a final thickness of around 1000 Å (FIG. 5). Similarly, as shown in FIG. 6, and using the ellipsometer controlled etch of this invention there was also an attempt to achieve a residual layer 42' having a thickness of 1000 Å. As shown in FIG. 5, using the prior art time etch technique one of the wafers had a residual thickness layer 42' as small as about 820 Å whereas another of the wafers had a residual thickness layer 42' of almost 1210 Å. Whereas, as shown in FIG. 6 using the ellipsometry controlled etching process of the present invention, each of the wafers had a final residual thickness layer 42' almost exactly on the desired thickness line, and with significantly less deviation.

According to one preferred embodiment of the invention, a rapid anisotropic etch is first accomplished in a processing chamber 10 and in the manner discussed above with respect to FIGS. 5, 6 and 7. However, to assure better anisotropic etching with less erosion of sidewalls, etc., the vacuum chamber is maintained at a pressure of about 250 mTorr and 300 watts, the temperature is maintained at about 0° C., and instead of carbon tetra-fluoride ($CF_4$) the chemicals used are selected to be 50 ccm of hydrogen bromide (HBr), 100 ccm of hydrogen chloride (HCl), and 27 ccm of helium (He). The anisotropic etching is allowed to continue until only a residual layer 42' of about 3 Å remains. To achieve maximum effectiveness, the residual layer 42' should be no more than about 20% of the original thickness of layer 42. In this preferred embodiment, once the rapid anisotropic etching has stopped so as to leave the residue layer 42', a second isotropic etching process is then begun using a process which may be substantially ineffective in etching the first layer 30 of material covering the semiconductor substrate 32. A second etching process could be selected from any number of chemical wet etch processes with the wafer removed from processing chamber 10. However, a highly selective isotropic etch particularly suitable for use in process chamber 10 subsequent and similar to the anisotropic rapid etch discussed above was chosen for this embodiment. According to this second etch, the HBr flow is increased to 63 ccm and the HCl flow is increased to 125 ccm while the He flow rate is maintained at 27 ccm. The pressure is reduced to 200 mTorr and the power to 110 watts while the temperature is still maintained at 0° C. In addition, an RF choke is turned on to create a 0 volt DC bias. Since the second etching process may be substantially slower, it is seen that by using the rapid first etching process to etch down to a minimum residual layer 42' such as 3 Å and then simply removing the three Å or so of residual layer 42' by the slow second etch process, the overall etchant time is decreased significantly. Further, in the event the first layer was an exceedingly thin layer and/or as susceptible to the rapid etching (or more so) it can be seen that if the rapid etching were allowed to proceed to completely remove the second layer 42 and start etching the first layer 30 it might substantially reduce the thickness of the first layer 30 or damage it such that it would be unusable. Thus, the ability to control the rapid etching process within three Å to achieve the thickness of the residual layer 42', provides significant advantages over prior art etching processes.

While the invention has been described with reference to illustrative embodiments, the description is not intended to be construed in a limiting sense. For example, although this invention has been discussed with respect to embodiments having a single layer over a substrate or two layers over a substrate, it will be appreciated that the invention is equally applicable to a multiple stack of layers. Various modifications and combinations of the illustrative embodiments as well as other embodiments of the invention, will be apparent to persons skilled in the art upon reference to the description. It is therefore intended that the appended claims encompass any such modifications or embodiments.

What is claimed is:

1. A method for processing a layer of material used in the fabrication of semiconductor devices comprising the steps of:
   placing a semiconductor device in a processing chamber, said semiconductor device having a first layer of a material covering portions of the surface of a second layer of said material;
   etching said first layer;
   monitoring in situ the thickness of said first layer during said etching and substantially in real-time using an ellipsometer;
   stopping said etching of said first layer so as to leave a residual layer having a selected thickness.

2. The method of claim 1 wherein said steps of monitoring includes obtaining a plurality of thickness measurements during said etching and further including the step of determining an etching rate from said plurality of thickness measurements.

3. The method of claim 2 wherein said etching is stopped after a period of time as determined by said etching rate to obtain said selected thickness.

4. The method of claim 1 wherein said step of etching comprises the step of anisotropic reactive ion etching.

5. A method for etching a layer of material used in the fabrication of semiconductor devices comprising the steps of:
   placing a semiconductor device in a processing chamber, said semiconductor device having a first layer of a material covering portions of the surface of a second layer of said material, said second layer covering said substrate;
   etching said first layer with a first etching process in said chamber;
   monitoring in situ and in real-time with an ellipsometer the thickness of said first layer during said etching with said first process;
   stopping said etching of said first layer with said first etching process so as to leave a residual layer of said first layer; and
   etching said residual layer with a second etching process to remove said first layer and expose said second layer said second etching process being different than said first etching process.

6. The method of claim 5 wherein said step of etching with a second etching process comprises the step of isotropic etching.

7. The method of claim 5 wherein said step of etching with a second etching process occurs at a slower rate than said first etching process.

8. The method of claim 5 wherein said step of etching comprises the step of anisotropic reactive ion etching.

9. A method for processing a layer of material used in the fabrication of semiconductor devices comprising the steps of:
   placing a semiconductor device in a processing chamber, said semiconductor device having a first layer of a material covering portions of the surface of a second layer of said material;
   etching said first layer;
   monitoring in situ the thickness of said first layer during said etching and in real-time using an ellipsometer; stopping said etching once said first layer has been removed.

10. The method of claim 9 wherein said step of etching comprises the step of anisotropic reactive ion etching.

* * * * *